Patented Aug. 9, 1949

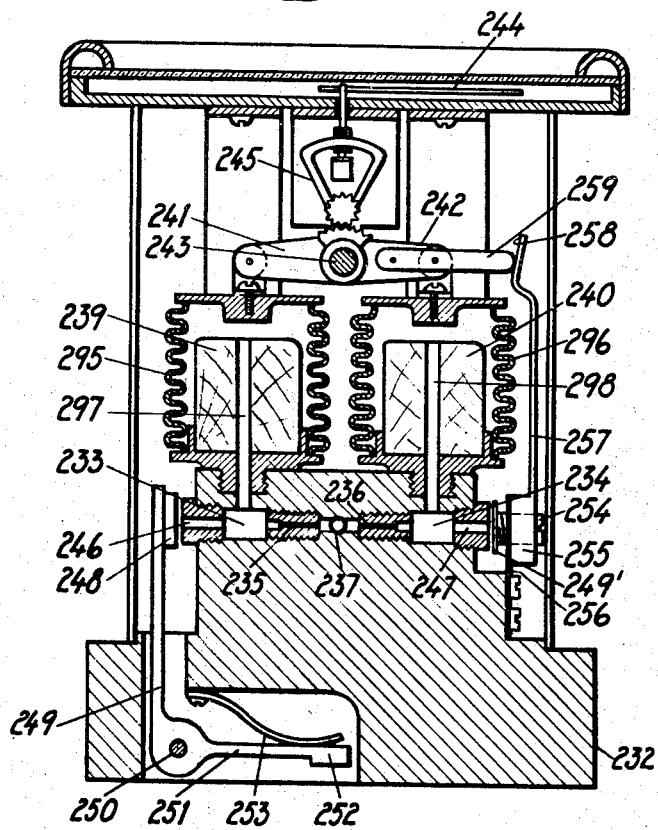

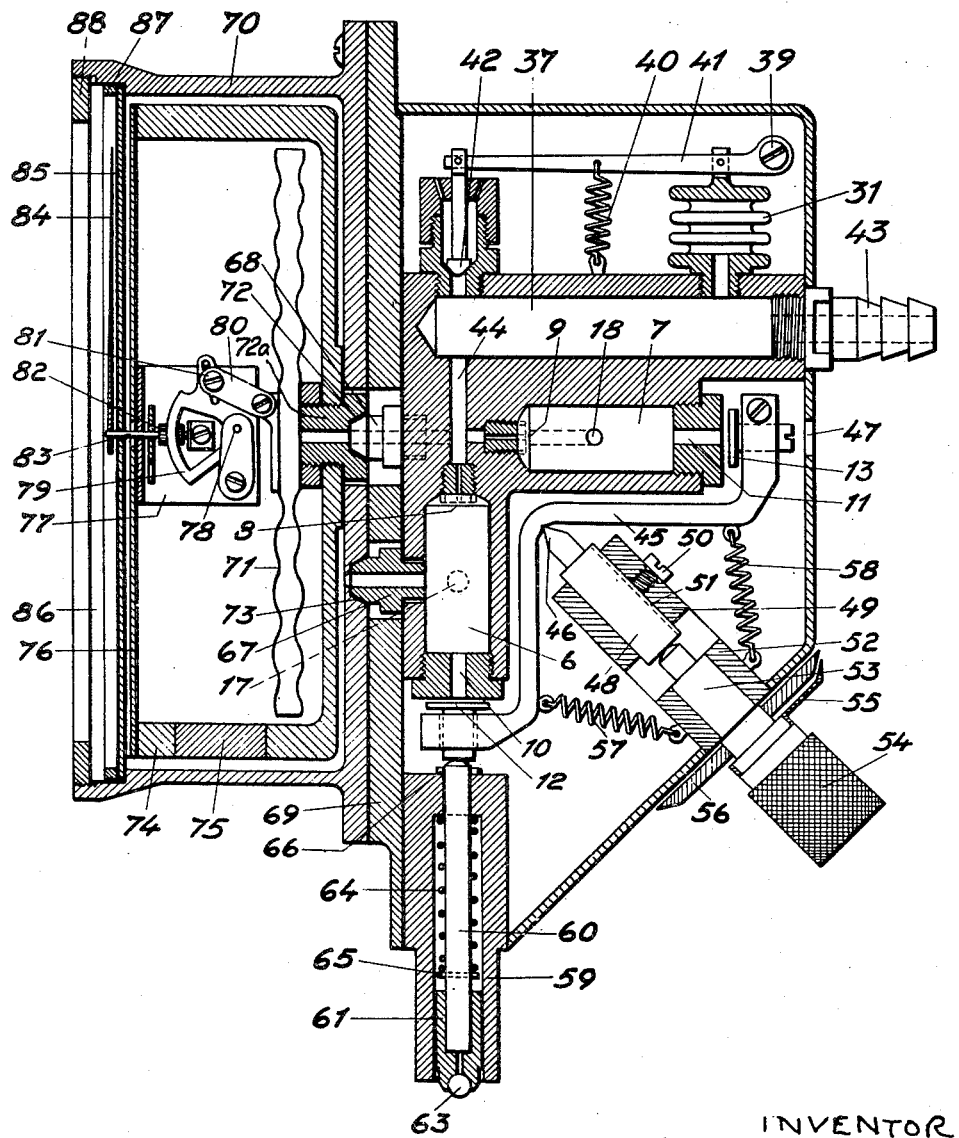

2,478,391

UNITED STATES PATENT OFFICE 2,478,391

APPARATUS FOR MEASURING SMALL DIMENSIONAL CHANGES

Carl Gustaf Hård af Segerstad, Sandviken, Sweden, assignor to Sandvikens Jernverks Aktiebolag, Sandviken, Sweden, a joint-stock company of Sweden Application July 7, 1944, Serial No. 543,925
In Sweden September 24, 1943

3 Claims. (Cl. 73—432)

The present invention relates to devices for the amplification or detection of small displacements, small deviations from a predetermined dimension or quantity, etc.

More particularly, the invention relates to devices for the purpose indicated in which the displacement etc. controls the flow of fluid in a fluid system in such manner as to produce variations of pressure in said system which are made to actuate suitable pressure responsive means.

The device according to the invention may be adapted to variety of purposes, for instance in measuring or recording apparatus, or in control or regulating apparatus for the control of one quantity in dependence upon another quantity, or for maintaining a quantity within predetermined limits.

An object of the invention is to provide a universally applicable device of the kind indicated.

Another object of the invention is to provide a device of the kind indicated, which has a high degree of magnification or sensitivity.

A further object of the invention is to provide a particularly sturdy and compact instrument of the type indicated.

Still further objects of the invention will appear from the following specification in connexion with the accompanying drawings, in which:

Fig. 1 is a sectional elevation of a device according to the invention provided with special means to increase the sensitivity, and Fig. 2 is a sectional view of a measuring instrument according to the invention.

In the embodiment shown in Fig. 1, a special reaction device is employed to obtain a particularly high degree of amplification. The instrument shown comprises a base member 232 enclosing a pair of fluid chambers 233, 234 having narrow inlet passages 235, 236 connected to a common supply conduit 237 adapted through means not shown to be connected to a source of constant fluid pressure. The fluid chambers 233, 234 are connected to bellows 295, 296 through conduits 297, 298 extending through wooden fillers 239, 240 serving to diminish the effective volume of the bellows. The upper ends of the bellows 295, 296 are hinged to the arms 241, 242 of a lever supported by an axle 243 adapted to actuate a pointer 244 through conventional transmission means 245.

The outlet passages 246, 247 of the fluid chambers are controlled by valve members 248, 249. The valve member 248 is attached to one arm 249 of a bell-crank lever pivoted at 250. The other arm 251 of said bell-crank lever is provided with a contact member 252 designed to be actuated by a feeler (not shown) for contacting a workpiece the thickness or length of which is to be measured, or by any other movable member the displacements of which are to be measured. A spring 253 serves to maintain said contact member 252 in engagement with said feeler. The valve member 249' is supported by a threaded spindle 254 mounted in a member 255 supported by a plate spring 256 attached to the base member 232. An arm 257 integral with the member 255 is provided with an oblique face 258 cooperating with a cam member 259 attached to the arm 242 of the lever 241—242.

The device functions as follows. If the contact member is deflected for instance upwards, the valve member 248 is displaced outwards from the outlet passage 246 of the fluid chamber 233, resulting in a decrease of the pressure in said chamber and in the bellows 295. The bellows contracts, turning the lever 241—242 counterclockwise. As the cam member 259 moves upwards, the plate spring moves the arm 257 and the member 255 to the left, which results in an increased obstruction of the passage 247 controlled by valve 249', and an increased pressure in the chamber 234 and the bellows 296. The bellows therefore expands, producing an added counter-clockwise deflection of the lever 241—242. Said added deflection results in an added leftward movement of the arm 257 and the member 255, and so on. The resultant deflection of the lever 241—242 (or the pointer 244) from the position of rest may be expressed as the product of the deflection which would be obtained if the valve member 249' were stationary, and a factor depending on the arrangement of the reaction device 255—256—257—258—259.

Fig. 2 shows a thickness or length measuring instrument according to the invention. Said instrument is adapted to be connected to a source of fluid pressure through a connecting piece 43 through which the pressure fluid is conducted into a chamber 37 of a constant pressure regulator comprising a bellows 31, a lever 41 supported on a fulcrum 39 and loaded by a spring 40, and a relief valve 42 operated by said lever. The regulated pressure is delivered through a conduit 44 to the narrow inlet passages 8, 9 of the pressure chambers 6 and 7 respectively. The outlets 10, 11 of said pressure chambers are controlled by valve members 12, 13. Said valve members are arranged on either arm of a lever 45 mounted on an edge 46. The valve member 13 is attached to the lever by means of a threaded stem screwed into said lever and may be adjusted by means of a screw driver introduced through an opening 47 in the instrument housing to engage a groove in said threaded stem. The edge 46 is supported by a slide member 48 guided in a socket 49 and locked against rotation by a screw 50 engaging a groove 51 in said slide member. The slide member abuts against a micrometer screw 52 engaging a sleeve 53 held in a lower part of the socket 49. The micrometer screw is operable by means of a knob 54 for adjusting the sensitivity of the device, the angular position of the screw being indicated by an index 55 cooperating with a dial 56. The lever is held against the edge 46 by springs 57, 58. The spring 57 is somewhat stronger than the spring 58 in order to maintain the stem of the valve 12 in engagement with an actuating rod 60 guided in a socket 59 and capped at its lower end by a sleeve 61 in which a ball 63 is fastened which serves as contact member for engaging a workpiece or other object to be measured. A spring 64 compressed between the pin 65 and a shoulder in the socket 59 tends to maintain the actuating rod 60 in the position shown, in which a stop pin 66 associated with the operating rod abuts against the upper face of the socket 59. The relation of the lever 45 to the rod 60 is such that in said position of the rod the lever occupies its neutral position, that is, the position in which the effective resistances of the outlet passages controlled by the valves 12 and 13 are equal.

The part of the device hitherto described is attached to one side of a base plate 69. To the other side of said base plate is attached a casing 70 containing an aneroid type expansible box 71 which is supported by an externally threaded sleeve 72a fitted in a threaded bore in a yoke 74 attached to the inside of the casing. The shaded area 75 shows the cross-sectional shape of said yoke. The pressure chamber 6 is connected to the space enclosed between the expansible box and the casing 70 through a conduit 17 terminating in a nipple 67 fluid-tightly connected to a bore in the casing 70 through a packing 73, while the chamber 7 is connected to the interior of the expansible box through a conduit 18 terminating in a nipple 68 fluid-tightly connected to the sleeve 72a through a packing 72. The degree of compression of the expansible box is indicated on a dial 85 by a pointer 84 the shaft 83 of which is connected with the movable diaphragm of the expansible box 71 through transmission mechanism comprising a link 80, a crown gear sector 79 connected to said link, and a pinion 82 mounted on the shaft 83 and engaging said crown gear sector. The pivot pin 78 of the crown gear sector 79 is mounted in a bearing supported by a bracket 77 attached to a plate 76 supported by the yoke 74. The connection between the link 80 and the crown gear sector 79 is effected through a screw 81 adapted to be locked in a desired position in a slot in said crown gear sector, by which means the ratio of transmission between the expansible box 71 and the pointer shaft 83 may be adjusted. The casing 70 is hermetically closed by a glass disk 86 held against a distance ring 87 by a ring 88 screwed into the casing.

It is clear from the foregoing description that any displacement of the actuating rod 60 from its normal position will result in a deflection of the pointer 85. The amplification, that is, the ratio of the deflection of the pointer, measured at the periphery of the dial, to the displacement of the actuating rod, is very great and may within limits be altered at will by adjusting the setting of the knob 54 and/or by adjusting the position of the screw 81. If the device is to be applied to the measurement of the checking of the thickness etc. of a workpiece it should be combined with a fixed support for the workpieces in such manner that the ball 63 in the neutral position of the rod 60 is situated at a predetermined distance above said support, said distance being slightly smaller than the dimension to be measured. The device can be calibrated by means of standard pieces having known thicknesses.

What I claim is:

1. In a device for the amplification or detection of small displacements, small deviations from a predetermined dimension or quantity, in combination, two fluid chambers having each a restricted inlet passage and a restricted outlet passage, means for connecting said inlet passages to a common source of fluid, a lever movable in response to said displacements, a valve member at one end of said lever for controlling one of said outlet passages, a valve member at the other end of said lever for controlling the other outlet passage, said valves being arranged in such relation to the respective outlet passages that any rotation of the lever on its fulcrum will move one valve member towards the passage controlled thereby and move the other valve member away from the passage controlled thereby, and means responsive to variations of the pressure difference between said fluid chambers to reproduce the displacements aforesaid.

2. In a device for the amplification or detection of small displacements, small deviations from a predetermined dimension or quantity, in combination, two fluid chambers having each a restricted inlet passage and a restricted outlet passage, means for connecting said inlet passages to a common source of fluid, a lever movable in response to said displacements, a fulcrum for said lever, means for adjusting the position of said fulcrum, a valve member at one end of said lever for controlling one of said outlet passages, a valve member at the other end of said lever for controlling the other outlet passage, said valves being arranged in such relation to the respective outlet passages that any rotation of the lever on its fulcrum will move one valve member towards the passage controlled thereby and move the other valve member away from the passage controlled thereby, and means responsive to variations of the pressure difference between said fluid chambers to reproduce the displacements aforesaid.

3. In a device for the amplification or detection of small displacements, small deviations from a predetermined dimension or quantity, in combination, two fluid chambers, means for maintaining a current of fluid through each of said fluid chambers, means responsive to said displacements for controlling the pressure in one fluid chamber, means movable in response to variations of the pressure difference between the fluid chambers, and means actuable by said pressure responsive means for controlling the pressure in the other fluid chamber whereby any movement of said pressure responsive means caused by an increase of pressure in said first-mentioned fluid chamber will cause a decrease of the pressure in said second mentioned fluid chamber.

CARL GUSTAF HÅRD AF SEGERSTAD.

REFERENCES CITED

The following references are of record in the file of this patent:

UNITED STATES PATENTS

| Number | Name | Date |
| --- | --- | --- |
| 1,007,178 | Billings | Oct. 31, 1911 |
| 1,106,907 | Wilkinson | Aug. 11, 1914 |
| 1,927,750 | Mennesson | Sept. 19, 1933 |
| 1,985,576 | Mennesson | Dec. 25, 1934 |
| 2,266,566 | Poole | Dec. 16, 1941 |
| 2,268,783 | Tate | Jan. 6, 1942 |
| 2,325,345 | Tate | July 27, 1943 |
| 2,343,181 | Heinz | Feb. 29, 1944 |
| 2,352,836 | Hertel | July 4, 1944 |